April 26, 1966 W. WEEKS 3,247,856
SPIRAL HAIRPIN
Original Filed June 28, 1961 2 Sheets-Sheet 1

INVENTOR.
WENDY WEEKS
BY E. M. Squire
ATTORNEY.

April 26, 1966 W. WEEKS 3,247,856
SPIRAL HAIRPIN
Original Filed June 28, 1961 2 Sheets-Sheet 2

INVENTOR.
WENDY WEEKS
BY
E. M. Squire

United States Patent Office 3,247,856
Patented Apr. 26, 1966

3,247,856
SPIRAL HAIRPIN
Wendy Weeks, 53 W. 11th St., New York, N.Y.
Continuation of application Ser. No. 123,929, June 28,
1961. This application May 3, 1965, Ser. No. 459,503
6 Claims. (Cl. 132—46)

This application is a continuation of my copending application Serial No. 123,929 filed on June 28, 1961 and now abandoned which, in turn, is a continuation-in-part of my abandoned application Serial No. 843,990 filed on October 2, 1959.

The present invention relates to a hairpin or hair ornament which is inserted in the hair or removed therefrom by a rotary or twisting movement.

The hairpin consists of a unitary spiral coil. One end of the coil is formed by an enlarged central head portion. The other end of the coil is narrowed to facilitate entry into the hair. Intermediate its ends, the coil defines a spiral hair receiving slot the inner end of which terminates in an enlarged eye. The slot extends around the head portion through an arc sufficient to cause a transfer of pressure from hair compressed within the eye to the sides of the entrance portion of the slot which leads to the eye. The unitary coil may be solid or its outline may be formed by a bent wire.

Various objects, features and advantages of the invention will become apparent upon reading the following specification together with the accompanying drawing forming a part thereof.

Referring to the drawing.

Figure 1:
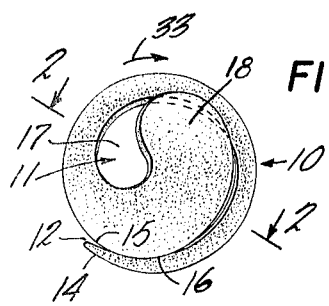
FIGURE 1 is a plan view of an embodiment of the invention having a single slot.
Figure 2:
FIGURE 2 is a sectional view in elevation taken along the line 2—2 of FIG. 1, looking in the direction of the arrows.
Figure 4:
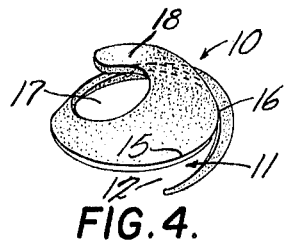
FIGURE 4 is a perspective view of the embodiment of FIGS. 1, 2 and 3.
Figure 3:
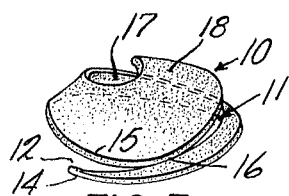
FIGURE 3 is a side elevational view of the embodiment of FIGS. 1 and 2.

Referring to FIGS. 1 to 4, the hairpin comprises a dished, unitary spiral coil designated generally as 10. The coil 10 is formed of sheet or sheet-like molded plastic, sheet metal, or other suitable springy material and intermediate its ends defines a continuous spiral slot which is designated generally as 11. The open outer end portion 12 of the slot 11 is located at the periphery of the coil 10 and is inwardly convergent, the outer end portion 12 of slot 11 being defined by a pointed portion 14 of the coil 10 and an adjacent curved edge portion 15 of the coil 10.

Proceeding inwardly along the slot 11, the open outer end portion 12 of the slot 11 converges into a narrowed gripping portion 16, the sides of which may yieldingly engage each other as shown in FIG. 1 of the drawing. Proceeding still further inwardly, the slot 11 terminates in an enlarged eye 17 which forms a rounded closed end for the slot 11. The eye 17 of the slot 11 is located centrally of the generally spiral coil 10, adjacent to the enlarged central head portion 18 as shown in FIG. 1.

Figure 5:
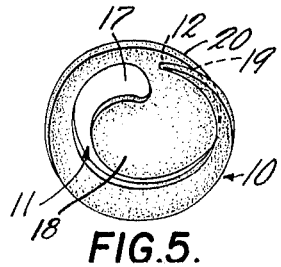
FIGURE 5 is a plan view of a modified form of the invention wherein the pointed portion of the hairpin which is located at the outer end of the slot is turned inwardly so that the outer end of the slot is located within the periphery of the hairpin.

In the modified form shown in FIG. 5, the pointed portion 19 of the coil 10 at the outer end of the slot 11 is located underneath the adjacent curved edge 20. The outer end portion 12 of the slot 11 is thus located below the adjacent outer edge 20 and within the periphery of the spiral coil 10.

Figure 6:
FIGURE 6 is a perspective view showing one of the smaller size hairpins being worn as an ornament.

In operation, the hairpin of FIG. 1 is inserted in the hair by engaging the outer pointed portion 14 of coil 10 so that a tuft of hair enters the inwardly tapering portion 12 of the slot 11. The unitary coil 10 is then turned clockwise as indicated by the arrow 33 in FIG. 1 so that the tuft of hair proceeds to be engaged progressively by the narrowed gripping portion 16 and then enters the enlarged inner terminal eye 17 of the slot. This is described in greater detail below. The pin of FIG. 1, when inserted in the hair, appears as illustrated in FIG. 6. In order to remove the hairpin from the hair, it is merely necessary to rotate the coil 10 in the opposite direction.

Figure 7:
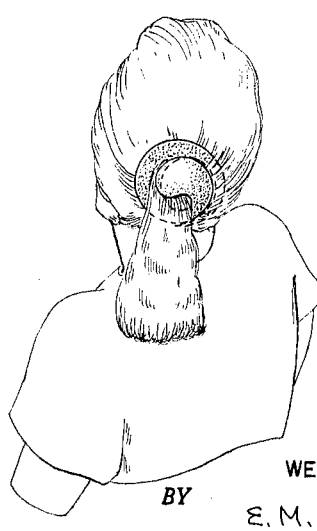
FIGURE 7 is another perspective view showing one of the larger size hairpins being worn to form a "pony tail" coiffure.

FIG. 7 shows the formation of a "pony tail" coiffure by means of a hairpin of larger size than the hairpin illustrated in FIG. 6.

Figure 8:
FIGURE 8 is a plan view of a modified embodiment of the invention which is formed of wire or other resilient material of small cross-sectional area, the outer ends being joined together to form an endless wire which has no free ends.

Referring to FIG. 8, the pin is formed of wire 22 or other suitable resilient material of small cross-sectional area. The inner end portion 23 forms a retaining eye 24. The outer ends of the wire are joined together at 25 to form an endless wire. This endless configuration permits the device to be formed by a transverse slice of an extruded tube, suitably cross-sectionally shaped, of material such as metal or plastic. The endless wire 22 defines a slot 26 having the same configuration as the slot 11 in the device of FIG. 1.

Figure 9:
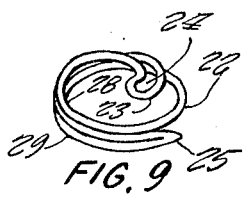
FIGURE 9 illustrates a modification of FIG. 8, wherein one pressure applying portion of the device intermediate its ends overlies another cooperating pressure applying portion.

In FIG. 9, the construction shown in FIG. 8 is modified so that the pressure applying portions 28 and 29 of the pin overlie each other.

Figure 10:
FIGURE 10 shows a further modification of the wire pin of FIG. 8 wherein one of the outer ends of the device is secured to the inner closed end portion, the other outer end remaining free.

FIG. 10 illustrates a modification of FIG. 8 wherein the wire 23, instead of being endless, has an end fixedly secured at 30 to the inner end portion 23 by welding or other suitable means. The other end 31 of the wire 23 is free.

Figure 11:
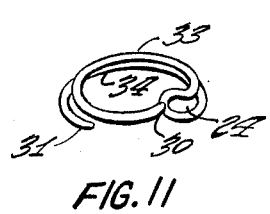
FIGURE 11 illustrates a modification of FIG. 10 wherein one pressure applying portion of the device intermediate its ends overlies another cooperating pressure applying portion.

In the modification of FIG. 11, the arrangement of FIG. 10 is shaped so that the pressure applying portions 33 and 34 overlie each other.

Figures 12, 13:
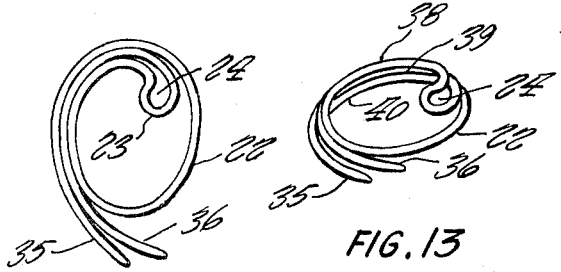
FIGURE 12 is a plan view of a device which is formed of wire, like FIG. 8, except that the two outer ends are free and slightly divergent instead of being joined together.
FIGURE 13 represents a modification of FIG. 12 wherein the pressure applying portions overlie each other.

In FIG. 12, the free ends 35 and 36 of the wire 22 are positioned in proximity to each other and are slightly divergent instead of being connected together as in FIG. 8.

FIG. 13 shows a modification of FIG. 12 wherein the three pressure applying portions 38, 39 and 40 overlie one another.

Figure 14:
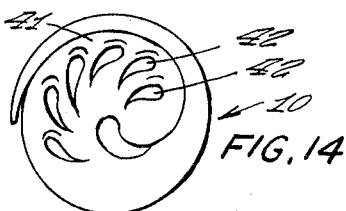
FIGURE 14 illustrates a modification of FIG. 1 wherein the central head portion is apertured instead of being solid.

FIG. 14 shows a modification of FIG. 1 wherein the enlarged central portion 41 of the body 10 has decorative apertures 42 formed therein. In addition to providing ornamentation, the apertures 42 reduce the weight and the amount of material required for each pin. This arrangement results in correspondingly reduced manufacturing and shipping costs.

Figure 15:
FIGURE 15 illustrates a "twist" coiffure established by the use of a pin accordance with FIG. 12 and another pin of the construction shown in FIG. 1, the latter pin being used to retain a short wisp of hair.

FIG. 15 illustrates a twist type of coiffure which is held in place by a single pin 44 which is constructed as described above in connection with FIG. 12. A short wisp of hair is shown held by a small size pin constructed in accordance with FIG. 1.

Figure 16:
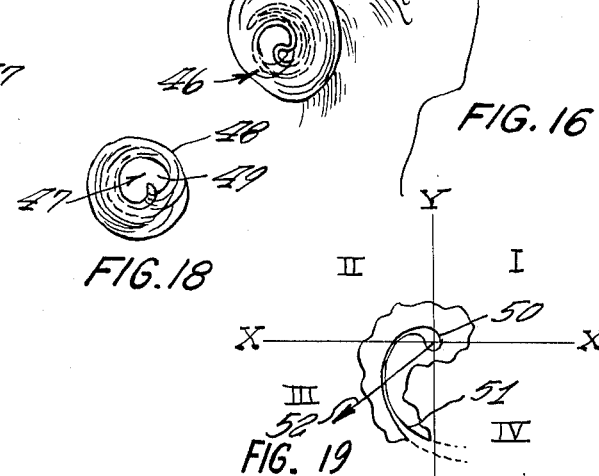
FIGURE 16 is a perspective view of a "chignon" type of coiffure secured by a pin of the form shown in FIG. 8.

FIG. 16 shows a pin 46 in accordance with FIG. 8 which holds a coiffure of the "chignon" type.

Figure 17:
FIGURE 17 shows a hair setting which comprises a group of pin curls each using a pin in accordance with FIG. 1.
Figures 18, 19:
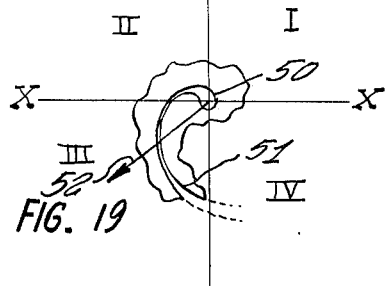
FIGURE 18 is an enlarged view of one of the pin curls of FIG. 17.
FIGURE 19 is a diagrammatic view which is referred to in connection with an explanation of the common pressure applying action of the various embodiments of the invention.

FIG. 17 shows a series of small sized pins 47 which are arranged to hold a pin curl hair setting. After the hair has set, the pins 47 are removed. As best shown in FIG. 18, the coiled strand of hair 48 is curled in the direction opposite to the direction of curvature of the exposed portion 49 of the pin 47. This arrangement provides a locking action which holds each pin curl securely.

The operation of the pin is illustrated in FIG. 19. The center of the enlarged inner end or eye 50 of the spiral slot 51 is located at the origin defined by coordinate axes X and Y. Proceeding counterclockwise into the second quadrant, the slot 51 becomes narrowed. In the unstressed condition of the pin, the slot is narrowest in the neighborhood where it crosses the X axis at a position located radially outwardly from the origin. The slot widens slightly as it progresses through the third quadrant in the unstressed condition of the pin. The outer open end of the slot, which may be extended into the fourth quadrant as shown in dotted lines, is widened in order to facilitate entry of the hair.

The hair is caused to enter the slot 51 by a rotary or twisting movement of the pin. As a result, hair becomes compressed in the eye 50. The resulting pressure is transferred in the third quadrant from the eye 50 to the outer portion of the slot 51. The direction of pressure transfer is indicated by the arrow 52. This transfer of pressure narrows the normally widened entrance portion of the slot thereby producing a gripping and locking action. In the embodiments of FIGS. 8–13, the wire 22 acts as a spring bow in effecting the transfer of pressure.

While I have shown and described what I believe to be the best embodiments of my invention it will be apparent to those skilled in the art that various changes and modifications may be made therein without departing from the spirit and scope of the invention as defined in the appended claims.

What is claimed is:

1. A hairpin consisting of a unitary coil, one end of said coil being formed as an enlarged central head portion of said hairpin, the other end of said coil being narrowed to facilitate entry into the hair by rotary movement of said hairpin, said coil, intermediate its ends, defining a spiral hair receiving slot the inner end of which terminates in an enlarged eye, said slot extending around said head portion through an arc sufficient to cause a transfer of pressure from hair compressed within said eye to the sides of the entrance portion of said slot which leads to said eye.

2. A hairpin according to claim 1, wherein said head portion is apertured.

3. A hairpin consisting of a dished unitary coil, one end of said coil being formed as an enlarged central head portion of said hairpin, the other end of said coil being narrowed to facilitate entry into the hair by rotary movement of said hairpin, said coil, intermediate its ends defining a spiral hair receiving slot the inner end of which terminates in an enlarged eye, said slot extending around said head portion through an arc sufficient to cause a transfer of pressure from hair compressed within said eye to the sides of the entrance portion of said slot which leads to said eye.

4. A hairpin consisting of a wire shaped to form a unitary coil, one end of said coil being formed as an enlarged central head portion of said hairpin, the other end of said coil being narrowed to facilitate entry into the hair by rotary movement of said hairpin, said coil, intermediate its ends defining a spiral hair receiving slot the inner end of which terminates in an enlarged eye, said slot extending around said head portion through an arc sufficient to cause a transfer of pressure from hair compressed within said eye to the sides of the entrance portion of said slot which leads to said eye, said wire acting as a spring bow in causing said transfer of pressure.

5. A hairpin according to claim 4, wherein said wire is an endless wire.

6. A hairpin according to claim 4, wherein said wire has two free ends which are positioned in proximity to each other and are slightly divergent.

References Cited by the Examiner

UNITED STATES PATENTS

| 1,725,125 | 8/1929 | Bartley | 132—46 X |
| 2,393,376 | 1/1946 | Holden | 132—46 |

FOREIGN PATENTS

| 1,128,037 | 7/1956 | France. |
| 2,421 | 1899 | Great Britain. |

RICHARD A. GAUDET, *Primary Examiner.*